J. DEVEY.
BEET HARVESTING MACHINE.
APPLICATION FILED FEB. 25, 1918.

1,299,825.

Patented Apr. 8, 1919.
2 SHEETS—SHEET 1.

Inventor
John Devey
By his Attorneys

UNITED STATES PATENT OFFICE.

JOHN DEVEY, OF LEHI, UTAH, ASSIGNOR OF TWO-THIRDS TO UTAH IDAHO SUGAR CO., OF SALT LAKE CITY, UTAH, A CORPORATION OF UTAH.

BEET-HARVESTING MACHINE.

1,299,825.　　　　　Specification of Letters Patent.　　Patented Apr. 8, 1919.

Application filed February 25, 1918. Serial No. 219,130.

*To all whom it may concern:*

Be it known that I, JOHN DEVEY, a citizen of the United States, residing at Lehi, in the county of Utah and State of Utah, have invented certain new and useful Improvements in Beet-Harvesting Machines; and I do hereby declare the following to be a full, clear, and exact description of the same, reference being had to the accompanying drawings, forming part of this specification.

This invention relates to beet harvesting machines and more especially to that type adapted for pulling sugar beets. One object of the present invention is to provide means for lifting the beets out of the ground after they have been dislodged by the plow points.

With the above and other objects in view, the invention consists in certain constructions, arrangements and combinations of parts which will be hereinafter described in a preferred form and particularly pointed out in the claims at the end of the specification.

Figure 1:
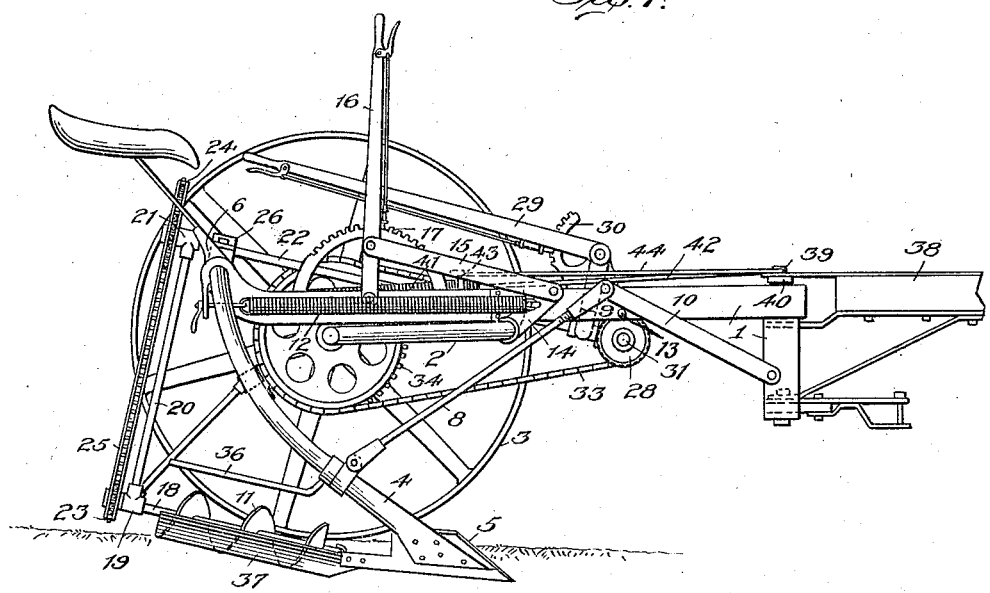
Figure 1 is a side elevation of a machine embodying the present improvements.
Figure 2:
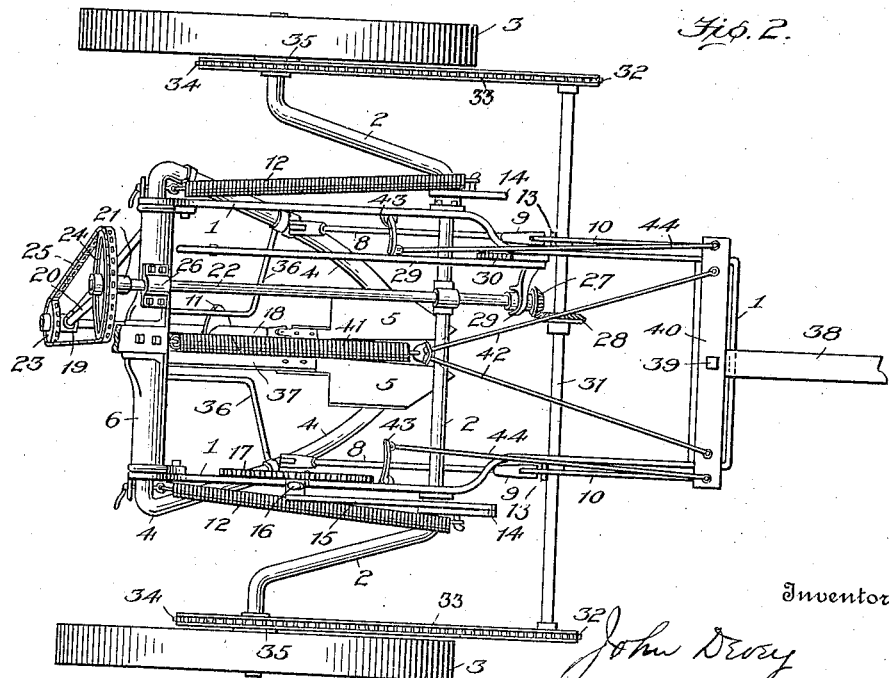
Fig. 2 is a top plan view of the machine.
Figure 3:
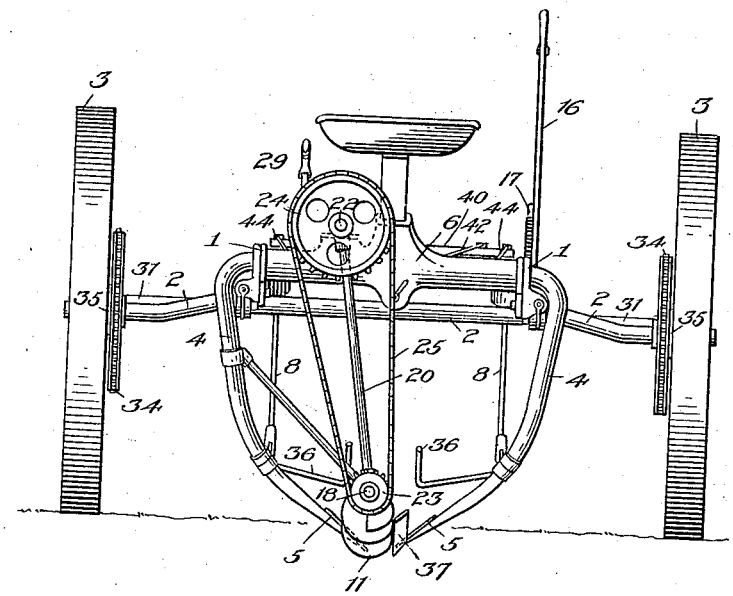
Fig. 3 is a rear elevation of the machine, parts being shown in section.
Figure 4:
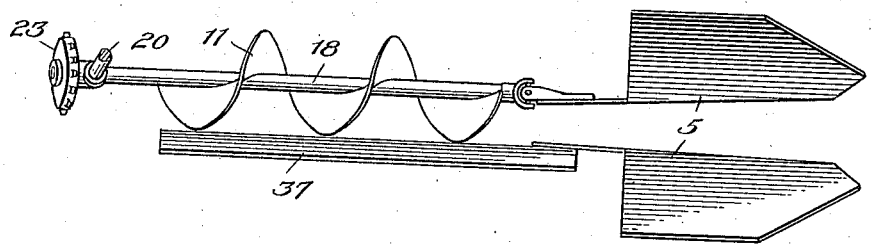
Fig. 4 is a detail view of the plow points and lifting mechanism.

Referring to the drawings, reference numeral 1 indicates the main frame in which is mounted a crank shaped axle 2 carrying ground wheels 3 adapted to rotate thereon. Plow points 5 are secured to the lower ends of downwardly extending arms 4 loosely mounted in the rear portion of the main frame 1. The two arms 4 are preferably integral, the connecting portion (not shown) intermediate the side members of the frame being inclosed by a casing 6.

Plow points 5 may be set at any desired height by means of brace rod 8, one end of which is attached to one of arms 4 and the other end of which is provided with a threaded socket 9 secured to a link 10 pivotally attached to the forward end of the main frame the downward movement of rod 8 and link 10 being limited by pins 13 on the frame. By detaching socket 9 and turning toward the right or left, the distance between the socket and arm 4 is increased or decreased, after which it is again secured to link 10, thus setting the plow points at any desired height. Pivotally mounted on the main frame is a lever 16 to which is connected one end of a link 15, the opposite end of link 15 being connected to a link 14 rigidly secured to the forwardly extending portion of axle 2. When it is desired to raise the plow points out of the ground temporarily, the lever 16 is moved backwardly whereupon the forward portion of the axle will be moved upwardly around the point at which the wheels are mounted on it. This upward movement of the forward portion of the axle elevates the frame and the latter carries the plow points with it by reason of the rod 8. To aid in thus elevating the frame and plow points a link 14 is provided on each side of the machine and has connected to it a spring 12 which is secured to the rear end of the machine. The tension of these springs tends to elevate the frame in the same manner as it is elevated by the hand lever, thus decreasing the power necessary to raise the frame by the latter.

Secured to the rear end of one of the plow points 5 at an inclination to the ground, is a rearwardly extending shaft 18 on which is mounted a worm conveyer 11 adapted to lift the beets upwardly from the plow points in a manner to be presently described. The connection between the plow point and the shaft is, preferably, in the form of a universal joint although any connection which will permit a vertical movement of the plow points independently of the shaft may be used.

Shaft 18 is supported adjacent its rear end in a bearing 19 formed in the lower extremity of a substantially vertical supporting rod 20 and is adapted to be rotated in the following manner: Journaled transversely in the main frame 1 is a shaft 31 on the ends of which are mounted sprocket wheels 32 adapted to be driven by sprocket chains 33 from sprockets 34 mounted on hub sleeves 35 which are rotated by the ground wheels when the machine is in motion. Preferably, sprockets 34 are secured to hub sleeves 35 with a pawl and ratchet mechanism similar to that shown and described in my prior Patent No. 1,046,448, dated December 10, 1912, so that they will be rotated only when the machine is driven forwardly. Mounted on shaft 31 is a beveled gear 28 which meshes with a beveled pinion 27 splined on a rearwardly extending shaft 22, pinion 27 being movable into and out of engagement with gear 28 by a hand lever 29 pivoted on one of the side members of the main frame, a pawl and quadrant 30 being provided for holding the hand lever in either of its positions. Shaft 22 is journaled intermediate its ends in bearing 26 formed on casing 6 and adjacent its rear end in bearing 21 formed in the upper end of supporting rod 20, and at its rear end it is provided with a sprocket wheel 24 made fast thereon in any suitable manner and adapted to drive a sprocket wheel 23 on shaft 18 by a sprocket chain 25.

When the machine is set in motion the rotary motion of the ground wheels will be transmitted by the instrumentalities just described to the conveyer which, due to its inclination to the ground, will lift the beets as they are pulled or dislodged from the earth by the plow points. During their movement along the conveyer a large proportion of the dirt that usually adheres to the beets will be broken loose, the beets, when they reach the rear end of the conveyer, falling to the ground practically clean.

The beets are guided in their travel along the conveyer by guide members 36 which are attached to the plow arms and extend along the sides of the conveyer immediately above the latter. The beets are also prevented from falling out of the conveyer by means of a retaining bar 37 attached to one of the plow points in any suitable manner, and extending rearwardly quite close to the side of the conveyer. Bar 37 is located on the side of the conveyer to which the beets will be moved by the rotation of the latter and in conjunction with the conveyer forms a trough in which the beets will travel upwardly, as described.

To maintain the machine in its normal line of travel with the space between the plow points in line with the row of beets, the tongue 38, which is pivotally attached to the main frame at 39, has a cross bar 40 rigidly secured thereto and a spring 41, one end of which is secured to casing 6, is connected by rods 42 to the cross bar 40 on opposite sides of the point at which the tongue is pivoted to the frame. The tension of spring 41 tends to hold the tongue at right angles to the frame thus causing the horses to travel in a substantially straight line along the row. When, however, the horses fail to follow the row and the tongue is moved to one side or the other, the horses are urged or guided back to the normal path of travel by means of the tongue which may be moved toward either side by foot levers 43 pivoted on opposite sides of the main frame and connected by rods 44 to cross bar 40 on opposite sides of pivot 39.

What I claim is:

1. In a beet harvesting machine, the combination of a main frame, depending plow point supporting members carried by the frame, plow points mounted on each of said members, a rearwardly extending inclined worm conveyer attached to one of said points, a retaining member attached to the other point and extending substantially parallel to the conveyer on one side of the latter, and rearwardly extending guide members mounted on the plow point supporting members, said guide members being located above the conveyer on opposite sides of the latter.

2. In a beet harvesting machine, the combination of a main frame, plow points carried by the main frame, a worm conveyer secured to one of said plow points and extending rearwardly therefrom at an inclination to the ground, means for rotating said conveyer, and a retaining member secured to one of the plow points and extending along one side of the conveyer.

3. In a beet harvesting machine, the combination of a main frame, traction wheels journaled thereon, plow points carried by the main frame, a shaft attached to one of the plow points and extending rearwardly therefrom at an inclination to the ground, a worm conveyer mounted on said shaft, connections intermediate the traction wheels and shaft for rotating the latter, and a retaining member on one side of the conveyer.

4. In a beet harvesting machine, the combination of a main frame, plow points carried by the main frame, a worm conveyer at the rear of one of said plow points, means for rotating said conveyer, a retaining member secured to one of the plow points and extending along side of the conveyer, and guides located above and on opposite sides of the conveyer.

JOHN DEVEY.

Copies of this patent may be obtained for five cents each, by addressing the "Commissioner of Patents, Washington, D. C."